United States Patent [19]

Osborn

[11] 4,179,247
[45] Dec. 18, 1979

[54] TURBOCHARGER HAVING VARIABLE AREA TURBINE NOZZLES

[75] Inventor: Norbert L. Osborn, Irving, Tex.

[73] Assignee: WRR Industries, Inc., Dallas, Tex.

[21] Appl. No.: 759,773

[22] Filed: Jan. 14, 1977

[51] Int. Cl.² .............................................. F04B 17/00
[52] U.S. Cl. .................................... 417/406; 415/163;
415/170 R; 308/189 A
[58] Field of Search ............... 417/406, 407, 408, 409;
415/159, 160, 162, 163, 164, 165, 170 R,
110–112; 184/6.11, 6.16, 26; 308/194, 189 A

[56] References Cited

U.S. PATENT DOCUMENTS

| | | | |
|---|---|---|---|
| 1,401,349 | 12/1921 | Miquet | 308/189 A |
| 2,413,285 | 12/1946 | Bousky | 184/6.26 |
| 2,492,672 | 12/1949 | Wood | 308/189 A |
| 2,715,814 | 8/1955 | Barr | 415/163 |
| 2,888,302 | 5/1959 | Cox et al. | 417/409 |
| 2,911,138 | 11/1959 | Birmann | 417/406 |
| 2,976,013 | 3/1961 | Hunter | 415/163 |
| 3,068,638 | 12/1962 | Birmann | 417/406 |
| 3,173,241 | 3/1965 | Birmann | 417/407 |
| 3,232,581 | 2/1966 | Swearingen | 415/164 |
| 3,263,424 | 8/1966 | Birmann | 415/160 |
| 3,310,940 | 3/1967 | Oetliker | 184/6.11 |
| 3,548,565 | 12/1970 | Toesca | 184/6.11 |
| 3,994,630 | 11/1976 | Rodgers | 417/407 |

FOREIGN PATENT DOCUMENTS

| | | | |
|---|---|---|---|
| 762097 | 5/1954 | Fed. Rep. of Germany | 417/406 |
| 2253231 | 5/1974 | Fed. Rep. of Germany | 417/407 |
| 1027121 | 5/1953 | France | 417/406 |

*Primary Examiner*—Michael Koczo
*Attorney, Agent, or Firm*—Richards, Harris & Medlock

[57] ABSTRACT

The invention provides a turbocharger for use with an internal combustion engine and includes a compressor for supplying air to the engine and a turbine for receiving driving exhaust gas from the engine. The turbine has a shaft integrally attached thereto with which the turbine rotates. The compressor is fitted on the turbine shaft for rotation with the turbine. The shaft is rotatively supported by ball bearing assemblies such that the compressor and turbine are overhung to one side of the bearing assemblies with the turbine separated from the bearing assemblies by the compressor. As a result of this arrangement, the bearing assemblies are removed from the turbine and the intense heat to which the turbine is subjected. This makes possible the use of limited lubrication for the bearing assemblies. The use of ball bearings also provides better control over the radial and axial movement of the turbine and compressor and permits reduced blade tip clearances. The turbocharger includes a turbine nozzle having a plurality of nozzle vanes spaced circumferencially about the turbine and in the inlet through which exhaust air from the engine is received into the turbine. A control linkage is positioned intermediate of the compressor and turbine and controls the position of the nozzle vanes to vary the flow of exhaust gases into the turbine. The variable area turbine nozzle control linkage includes a control ring having an outer ring moveable angularly relative to an inner ring. An actuation lever is rotatable with each vane and has one end engaged in the outer ring of the control ring. A control rod is attached to one of the actuation levers and structure is provided for selectively moving the control rod to pivot the actuation lever attached thereto. This in turn rotates the outer ring of the control ring thereby pivoting each of the actuation levers and the vanes attached thereto.

22 Claims, 5 Drawing Figures

TURBOCHARGER HAVING VARIABLE AREA TURBINE NOZZLES

BACKGROUND OF THE INVENTION

1. Field of the Invention

The present invention relates to turbochargers and more particularly to turbochargers for use on relatively small as well as large internal combustion engines.

2. Prior Art

Turbocharging is a means of greatly extending the power range and flexibility of internal combustion engines and has come to be an accepted practice, and in many cases a necessity, for heavy duty diesel engines of 200 or more horsepower. Turbocharging is also used to maintain power at increasing altitude, for instance in aircraft engines.

The effective application of a turbocharger to an internal combustion engine will normally increase power output 50–100 percent and reduce full load specific fuel consumption (sfc) by 50–10 percent. The reduced specific fuel consumption is attributed to two items. First, at a given speed the engine internal friction remains relatively constant even though the power output is increased considerably. This results in an effective improvement in mechanical efficiency. Second, if the efficiencies of the turbocharger components are high enough and the exhaust temperature of the engine on which the turbocharger is used is sufficiently high, there will result a positive pumping loop that adds to the net cycle output.

Turbocharging is normally thought of only as a means for increasing horsepower of decreasing full load specific fuel consumption. In the evolution of engines presently utilizing turbochargers, such as large heavy duty diesel engines, aircraft engines, racing engines and the like, this understanding has been adequate in that in the end application these engines are operated at or near full load for a large portion of the duty cycle. However, most applications do not require that the engine operate at or near full load for extended periods of time. In fact, in most applications, the engine generally is operated below 50% power and in many applications the engines operates well below 20% power during most of its operation. Examples of these applications are engines used in automobiles, light and medium trucks, generator sets, compressors, tractors, construction equipment and the like.

Engines operating at these low power settings are very inefficient. In a diesel engine, this inefficiency is a result of thermal efficiency decay as combustion temperature decreases and because the internal engine friction remains relatively constant regardless of load. In a gasoline engine, this inefficiency results from pumping loop loss increases with decreasing load and because the internal engine friction remains relatively constant regardless of load.

Thus, by utilizing a smaller "effective engine size," that is, an engine having a smaller displacement rate (the product of ½ displacement times engine speed for a four cycle engine) by either a reduction in displacement, a reduction in operating speed, or a combination of both, the part load fuel consumption may be improved. In gasoline engines, this improvement results from reduced engine friction and reduced pumping loop losses. In diesel engines, this improvement is a result of reduced engine friction and a higher thermal efficiency due to higher combustion temperatures.

In many applications, turbocharging may be used to permit the use of engines having smaller "effective engines size." By turbocharging, it is relatively easy to obtain twice the naturally aspirated power per cubic inch of displacement and in some cases three times the power. However, attempts to turbocharge smaller "effective engine sizes" have generally been unsuccessful. This failure can generally be attributed to the present design of turbochargers which are built around a journal bearing and a flat disc type thrust bearing. This type bearing system requires from one to three horsepower (depending upon the particular turbocharger and the speed required in the application) just to overcome friction. While this loss may be somewhat insignificant in applications where turbines are required to develop in excess of thirty horsepower for the compression process (typically engines of 200 or more horsepower), it becomes very significant when turbocharging engines having less than 100 horsepower. For example, where the turbocharger turbine power is 60–80 horsepower, a bearing friction loss of 2–3 horsepower is insignificant. However, in a smaller turbocharger where the turbine power is only 15 horsepower a bearing friction loss of 2–3 horsepower, or more likely 4–5 horsepower due to the higher rpm at which the smaller turbochargers are operated, represents almost a third of the total turbine horsepower produced and is completely unacceptable.

The presently used bearing systems also require considerable radial and axial clearances to provide for oil flow and rotor stability. These clearances are translated into a relatively large clearance over the blading of the compressor and turbine rotors thereby affecting the efficiency of both the compressor and turbine. For example, the journal and disc thrust bearings, commonly used in present day turbochargers, may require a clearance of 0.015 inches between the turbine and compressor blades and the surround structure. Where the blade height is 1 inch, the clearance to blade height ratio is only 1½ percent. However, where a smaller turbocharger is desired, having blade heights of 0.2 inches, a clearance of 0.015 inches between the blades and surround structure amounts to 7½ percent of the blade height. Therefore, where an 0.015 inch clearance is acceptable in larger turbocharger applications, it becomes completely unacceptable when smaller turbochargers are being designed. Therefore, in smaller turbochargers, this clearance becomes more and more critical to the overall performance of the turbocharger and ultimately to the performance of the engine.

The bearing system now being used in turbochargers are lubricated with engine oil, although all bearing failures are the result of contaminated engine oil or lack of engine oil pressure during starts. Where high speed journal bearings are used in a conventional turbocharger, continuous oil flow is inherently required to provide shaft stability as well as to carry away heat generated by viscous friction. Oil flow is also required to carry away the heat transferred into the bearing system from the adjacent turbine (which operates at temperatures as high as 1600 degrees F.). Even if antifriction ball bearings were substituted for the journal bearings in conventional turbochangers, a continuous oil flow would be required to carry away heat transferred from the turbine. Thus, while lubrication is a necessity for the proper operation of present day turbochargers, lubrication also accounts for many of the failures. Further, continuous oil flow lubrication requires substantial plumbing and associated structure for providing the lubricant to the bearings.

Moreover, the present day turbochargers have failed to efficiently control the flow of motive gases through the turbine. Presently, there are basically two methods used for controlling pressure through the turbine. The first of these methods is by careful sizing of the turbine and turbine nozzle area so that at maximum engine operating speed and load the desired boost pressure will not be exceeded. The disadvantage of this method is that at low engine speeds the available boost pressure is limited and the response to demand is slow. The second method used for controlling the pressure through the turbine is the use of a "wastegate" in conjunction with a turbine nozzle sized to produce excessive turbine power at maximum engine speed and load. In this method, when the predetermined boost pressure is reached, the "wastegate" opens and bypasses a portion of the exhaust gases. While this method increases the available boost at the lower engine speeds and provides improvements in response, it is quite inefficient in that the bypassed, high pressure exhaust gas is simply wasted at the expense of increased engine back pressure. Additionally, at part load, when the turbocharger is essentially inoperative, the small nozzle area acts as a restriction to the exhaust and causes an increase in the pumping loop loss.

Therefore, a need has arisen for a turbocharger which can be efficiently operated to turbocharge both small and large internal combustion engines. The need is for a turbocharger having a bearing system which eliminates the problems heretofore experienced by continuous engine oil lubricated bearings and makes the most efficient use of the motive gases for driving the turbocharger turbine. Further, the bearing assemblies supporting the rotation of the compressor and turbine must facilitate the reduction of the required compressor and turbine rotor clearances.

SUMMARY OF THE INVENTION

The present invention provides an improved turbocharger for use with internal combustion engines which overcomes many of the disadvantages heretofore experienced by prior art turbochargers. In accordance with one embodiment of the invention, the turbocharger includes a compressor for supplying air to an engine and a turbine for receiving driving exhaust gas from the engine. The turbine has a shaft integrally attached therewith with which the turbine rotates, and the compresser is fitted on the turbine shaft for rotation with the turbine. The shaft is rotatively supported by bearing assemblies such that the compressor and turbine are overhung to one side of the bearing assemblies with the turbine separated from the bearing assemblies by the compressor. As a result of this arrangement, the bearing assemblies are removed from the turbine and the intense heat to which the turbine is subjected.

In accordance with another embodiment of the invention, antifriction ball bearing assemblies are used for supporting the compressor and turbine shaft. The use of ball bearings are particularly critical in providing better control over the radial and axial movement of the turbine and compressor. This additional control over the movement of the rotating assembly allows reduced blade tip clearances thereby appreciably improving compressor and turbine efficiency. The use of antifriction ball bearings further reduces the turbine work required thereby improving the specific fuel comsumption of the engine.

In one embodiment of the present invention, the bearing assemblies include a first and second inner raceway formed in the compressor and turbine shaft. A fixed outer raceway corresponding to the first inner raceway is attached to the turbocharger housing and a plurality of balls are received between the fixed outer raceway and the first inner raceway. A second outer raceway ring is provided and is slidable relative to the first outer raceway. This second outer raceway ring is slidable relative to the housing and a compression spring acts between the turbocharger housing and the ring to bias the ring away from the first outer raceway and in engagement with balls positioned between the ring and the second inner raceway. Simultaneously therewith, the first outer raceway, attached to the turbocharger housing, is engaged against the balls between such raceway and the first inner raceway on the turbine and compressor shaft.

In accordance with another aspect of the invention, a turbocharger includes a variable area turbine nozzle having a plurality of nozzle vanes spaced circumferencially about the turbine and in the inlet through which exhaust air from the engine is received into the turbine. A control linkage is positioned intermediate of the compressor and turbine and controls the position of the nozzle vanes to vary the flow of exhaust gases into the turbine. In one embodiment of the invention, the variable area turbine nozzle control linkage includes a control ring having an outer ring moveable angularly relative to an inner ring. An actuation lever is rotatable with each vane and has one end engaged in the outer ring of the control ring. A control rod is attached to one of the actuation levers and structure is provided for selectively moving the control rod to pivot the actuation lever attached thereto. This in turn rotates the outer ring of the control ring thereby pivoting each of the actuation levers and the vanes attached thereto.

The use of variable area turbine nozzles provides more efficient control of peak boost pressure while allowing greater boost at lower engine speeds than now attainable. Variable area nozzles also improves transient response and provides a better part load specific fuel consumption in that the nozzle area can be opened to minimum engine back pressure during part load operation. Moreover, the present invention provides a very straight forward arrangement for conveniently controlling a plurality of nozzle vanes circumferencially spaced in the turbine inlet. The control linkage is conveniently positioned in the unused space intermediate of the compressor and turbine and in addition to providing for a very compact turbocharger "package", the control linkage space further provides an insulation shield between the heat of the turbine area and the bearing assembly supporting the compressor and turbine shaft.

DESCRIPTION OF THE DRAWINGS

For a more complete understanding of the present invention, and for further details and advantages thereof, reference is now made to the following description taken in conjunction with the accompanying drawings, in which.

DESCRIPTION OF THE PREFERRED EMBODIMENTS

Figure 1:
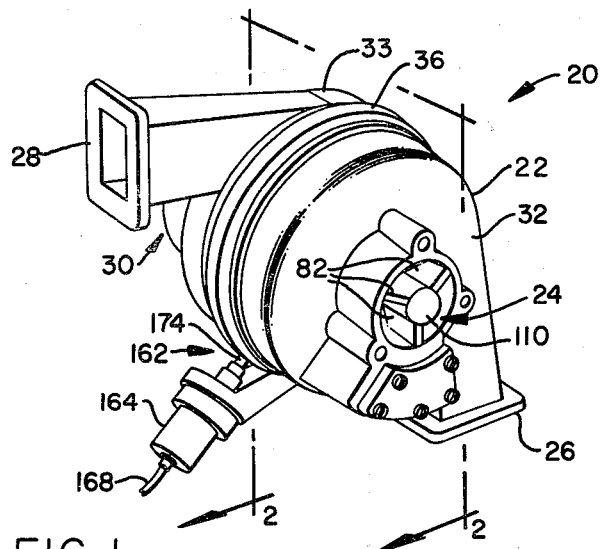
FIG. 1 is a perspective view of the turbocharger of the present invention.

FIG. 1 is a perspective view of a turbocharger 20 embodying the present invention. The turbocharger includes an outer structure 22 having a compressor air inlet 24 and a compressor exhaust 26 formed therein. Structure 22 is also formed with a turbine air inlet 28 and a turbine exhaust 30. In operation of the turbocharger, air is drawn into inlet 24 and compressed air is discharged from exhaust 26 to an internal combustion engine on which the turbocharger is mounted. Exhaust air from the engine is channeled into turbine air inlet 28 to drive the turbocharger turbine and is exhausted through turbine exhaust 30.

Figure 2:
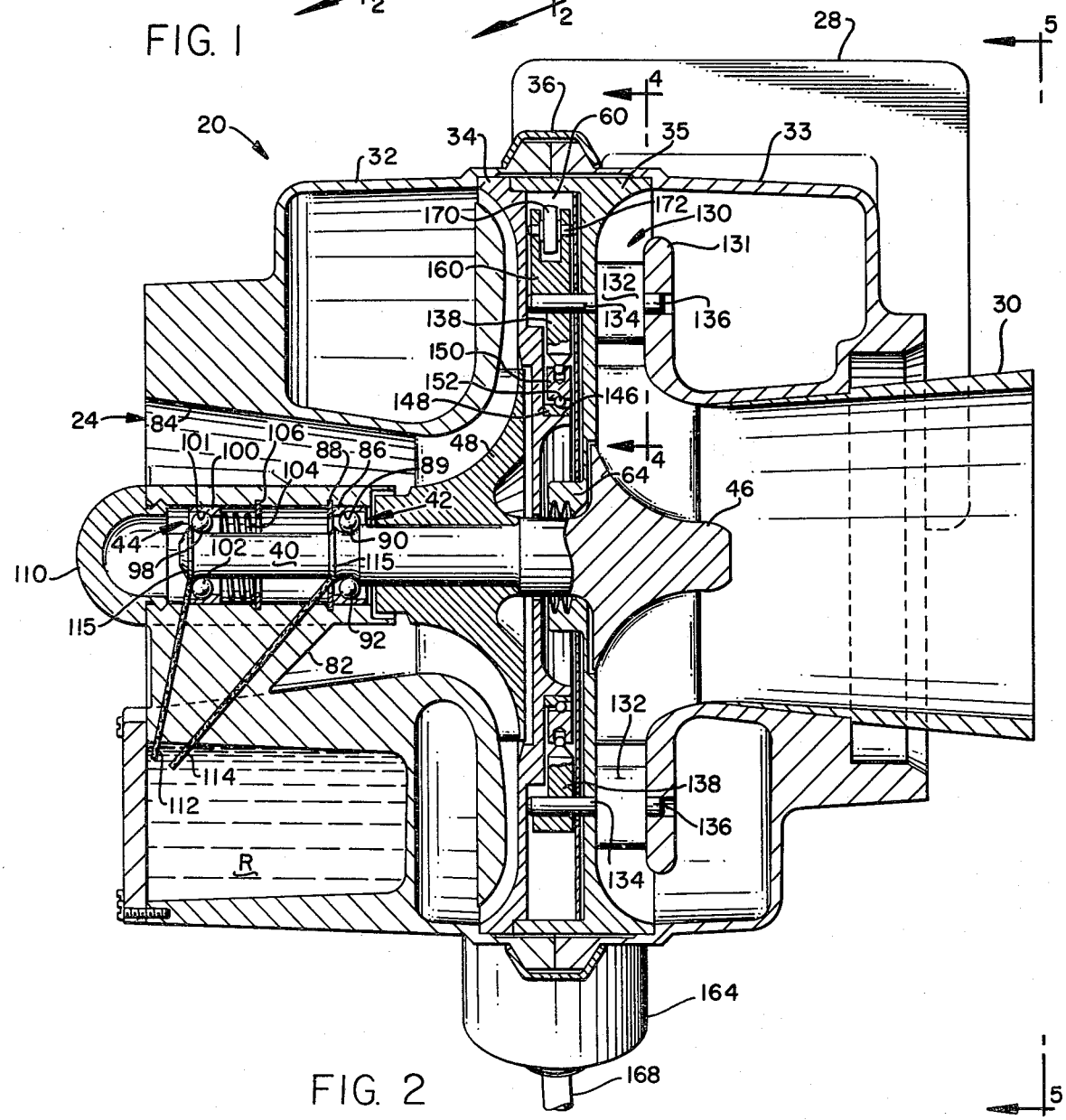
FIG. 2 is a vertical section of the turbocharger illustrated in FIG. 1.

Referring to FIGS. 1 and 2, structure 22 consists of four sections, namely a compressor housing 32, a turbine housing 33, a compressor back wall 34 and a turbine back wall 35. These four components are piloted one to another and held in assembly by V-clamp 36. Turbocharger 20 further includes a shaft 40 supported for rotation in housing 22 by two ball bearing assemblies 42 and 44. A radial flow turbine 46 is mounted at the end of shaft 40 opposite the end rotatable in bearing assemblies 42 and 44, and a radial flow compressor 48 is mounted intermediate of turbine 46 and bearing assemblies 42 and 44. Back walls 34 and 35, with an air gap 60 between them, act as a thermal barrier to resist heat transfer from the turbine to the compressor and bearing assemblies. A labyrinth seal 64 is provided on the turbine back wall to seal between compressor 48 and turbine 46.

The description of the support of shaft 40 by bearing assemblies 42 and 44 from housing 22 will be described by referring to FIGS. 2 and 3. A support sleeve 80 is supported concentrically within air inlet 24 by a plurality of struts 82 extending radially inwardly from the conical wall 84 forming air inlet 24. A ring 86 is fitted within the end of sleeve 80 adjacent compressor 48 and is prevented from moving into sleeve 80 by a clip ring 88 attached to sleeve 80. Outer raceway 89 of bearing assembly 42 is formed in ring 86, the inner raceway 90 being integrally formed in shaft 40. Balls 92 are engaged between the inner and outer raceways to form bearing assembly 42.

Bearing assembly 44 includes inner raceway 98 formed integrally in shaft 40 and an outer ring 100 slidable within sleeve 80 with an outer raceway 101 formed therein for receiving balls 102. A compression spring 104 is engaged between ring 100 and a retaining ring 106 fixed within sleeve 80 and biases ring 100 outwardly to fix the position of balls 92 and 102 in bearing assemblies 42 and 44, respectively, thereby fixing the position of shaft 40.

Figure 3:
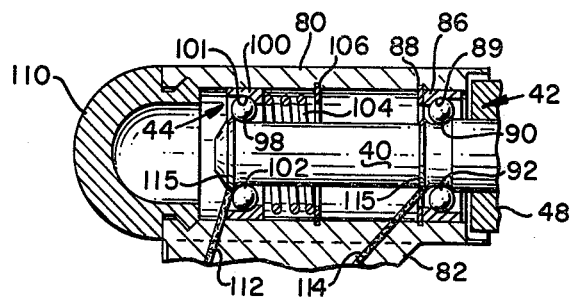
FIG. 3 is an enlarged view of the bearing assemblies supporting the compressor and turbine shaft of the present invention.

As is shown in FIG. 3, outer raceway 89 is formed in ring 86 with the ball radius on only one side. Thus, the assembly of bearing assembly 42 is easily made by positioning a full compliment of balls 92 in raceway 90, and engaging ring 86 therearound. Similarly, outer raceway 101 is formed in ring 100 with the ball radius on only one side. Balls 102 of bearing assemblies 44 are assembled by retracting ring 100 to compress spring 104 and inserting a full compliment of balls 102 in raceway 98 of shaft 40. By releasing ring 100, spring 104 automatically forces the ring into engagement with balls 102 to form bearing assembly 44 while simultaneously engaging ring 86 against balls 92 of bearing assembly 42.

Alternatively, less than a full complement of balls 92 and 102 may be used in bearing assemblies 42 and 44 by the use of an appropriate retainer. Depending upon the application, an oil impregnated retainer or a sacrificial retainer which replenishes a self-lubricating coating to the balls may be used. In either event, the mounting of shaft 40 within sleeve 80 is completed by the engagement of cap 110 on the end of sleeve 80 to close the opening in sleeve 80 remote from compressor 48.

The use in the present bearing system of the ball bearing arrangement employing integral inner raceways permits a larger diameter shaft and thus provides a very "stiff" shaft. Additionally, this bearing arrangement provides a very tight bearing system permitting very little radial or axial movement. As a result, the present bearing system substantially reduces the clearance required between the compressor and turbine and surrounding housing.

In a preferred embodiment of the invention, bearing assemblies 42 and 44 are "starved" of oil. The only lubrication provided to the bearing assemblies is through wicks 112 and 114 which transfer oil from a reservoir R by capillary action to ramps or slingers 115. Oil supplied to slingers 115 is projected by centrifugal force to bearing assemblies 42 and 44 during rotation of shaft 40.

In this way, the use of engine oil as a lubricant for the turbocharger bearings, and the associated plumbing required, is eliminated. Moreover, the failures resulting from the use of contaminated engine oil as a lubricant or the lack of engine oil during starts is avoided. Moreover, no oil seals are required and bearing failure resulting from the failure of seals is also eliminated.

Alternatively, the bearing assemblies may be permanently lubricated with a heavy consistency oil or grease which is packed into the raceways and around the balls of the bearing assemblies. Alternatively, an oil impregnated phenolic retainer may be used to provide lubricant to the balls for a considerable period. In either of these cases, the need for wicks 112 and 114 and slingers 115 would be eliminated.

In conventional turbochargers where journal bearings and disc type bearings are employed, continuous lubrication of the bearings is required. Additionally, because the turbine is subjected to temperatures up to 1600 degrees F., where the bearings are adjacent the turbocharger turbine continuous lubrication is required to sufficiently cool the bearings to prevent failure through overheating. Even ball bearings would require a continuous flow of oil for cooling. The ability of the present system to successfully function without conventional flood lubrication used to both lubricate and cool the bearings in turbochargers is the result of the particular arrangement of the type of bearings used in the present invention and the relative location of the bearings to the compressor and turbine.

In the present invention, the journal and disc bearings of conventional turbochargers are replaced by the more precise ball type bearing assemblies thereby eliminating the need for a continuous flow of lubrication for the bearings. Additionally, both the compressor and the turbine of the present turbocharger are overhung to one side of the bearing assemblies, and the turbine is maximally removed from the bearing assemblies with the compressor positioned between the bearing assemblies and the turbine. As this arrangement provides sufficient thermal insulation between the turbine and the bearing assemblies, the bearings will not be sufficiently heated as to required conventional lubrication methods.

The back to back compressor/turbine arrangement of the present invention not only reduces substantially the heat conducted to the bearing assemblies but also minimizes the thermal expansion effects on the compressor thereby lowering the blade tip clearances required. This arrangement further provides a more compact package than present straddle mounted rotors having the support bearings intermediate of the compressor and turbine.

Additionally, the use of antifriction ball bearing assemblies 42 and 44 provide much better control over the radial and axial movement of the compressor and turbine thereby allowing reduced blade tip clearance. This in turn appreciably improves the compressor and turbine efficiency. The use of the anti-friction ball bearing assemblies 42 and 44 also reduce the turbine work required to drive the compressor. This in turn reduces the engine back pressure resulting in the improvement of the specific fuel comsumption.

Figure 5:
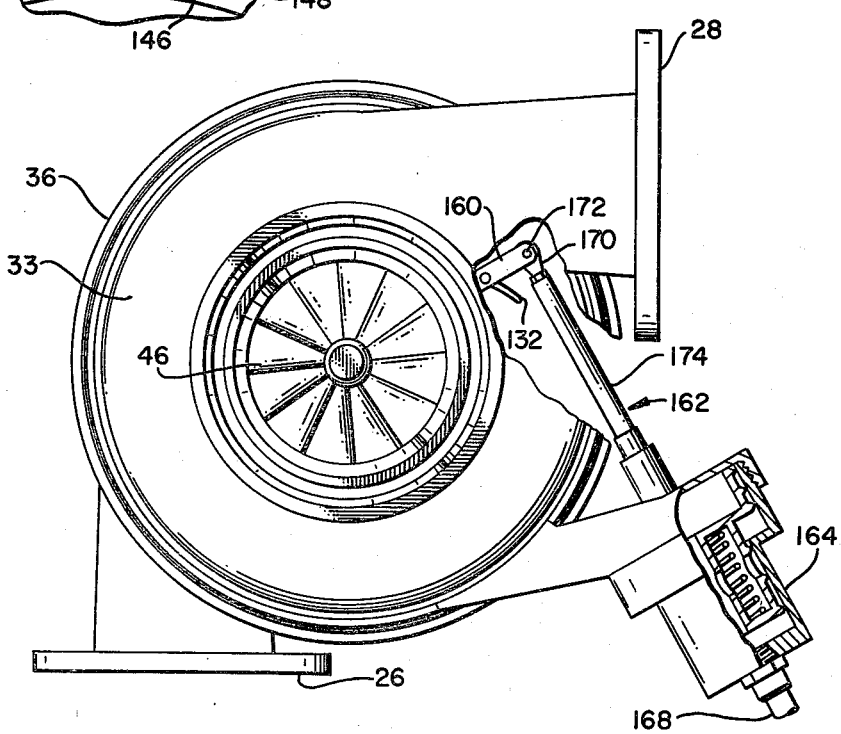
FIG. 5 is a partially broken away end view as viewed from lines 5—5 of FIG. 2 looking in the direction of the arrows.

The present invention is also directed to an arrangement for selectively varying the turbine nozzle area in order to improve the efficiency of the turbine. Referring to FIGS. 1 and 2, exhaust air from the internal combustion engine on which the turbocharger is mounted is injected into the turbocharger through turbine air inlet 30 and channeled against the blades of turbine 46 through a nozzle 130 formed by turbine back wall 35 and a wall 131 parallel thereto. This nozzle area is controlled by a plurality of movable nozzle vanes 132 positioned circumferencially about the nozzle area and rotatable to open and close off flow of exhaust air to turbine 46. Referring to FIGS. 2 and 5, vanes 132 include a trunnion 134 and 136 extending from opposite sides thereof. Trunnion 134 extends through turbine back wall 35 and is attached to an actuation lever 138. Trunnion 136 extends into wall 131.

A spherical nipple 140 is formed on one end of each actuation lever 138. These nipples extend into radial holes 142 formed in a control ring 144. Control ring 144 and actuation levers 138 are situated in air gap 60 intermediate of compressor 48 and turbine 46. Control ring 144 is concentrically positioned about the axis of shaft 40 and is received on a cylindrical surface 146 extending from compressor back wall 34.

In a preferred embodiment of the invention, control ring 144 includes an inner ring 148 and an outer ring 150 formed with an inner and outer race, respectively, for receiving a plurality of balls 152 therebetween. Inner ring 148 is fixedly attached to the cylindrical surface 146 extending from compressor back wall 34, and outer ring 150 rotates angularly relative to the inner ring. By reference to FIG. 5, it can be seen that by the rotation of outer ring 150, each of the actuation levers 138 are rotated about the axis of trunnions 134 and 136 resulting in the simultaneous rotation of each nozzle vane 132. As can be seen in FIGS. 5 and 6, one of the actuation levers 138 is provided with an extension 160, and a control rod 162 is attached to the end of extension 160 remote from nipple 140. Control rod 162 includes a threaded eye bolt 170 attached to the extension 160 by axis pin 172. The opposite end of eye bolt 170 is threadedly received within the main shaft 174 of control rod 162 and it is adjustable therein to allow for the readjustment of nozzle vanes 132 about their rotational axes. Thus, by the movement of control rod 162, actuation lever 138 is pivoted to angularly rotate outer ring 150 of control ring 144 thereby rotating each of the other actuation levers 138 and nozzle vanes 132 attached thereto.

Referring to FIG. 6, control rod 162 is controlled by a piston type actuator 164. Actuator 164 is controlled by compressor discharged pressure fed into cylinder 166 through line 168. Increased pressure into actuator 164 causes the extention of control rod 162 and the corresponding opening of the compressor nozzle area. While the preferred embodiment of the invention envisions the use of a piston type actuator using compressor discharged pressure as the control parameter, it will be understood by those skilled in the art that various other types of control actuators may be used without deviating from the scope of the present invention.

Therefore, in operation of the variable area turbine nozzle, a control signal, such as compressor discharge pressure, is communicated to actuator 164 which appropriately extends or retracts control rod 162 in accordance with the signal to the actuator 164. This in turn results in the rotation of actuation arm 138 attached to control rod 162 and the simultaneous angular rotation of outer ring 150 of control ring 144. The rotation of outer ring 150 in turn rotates each actuation arm 138 to correspondingly set the angle of nozzle vanes 132.

Figure 4:
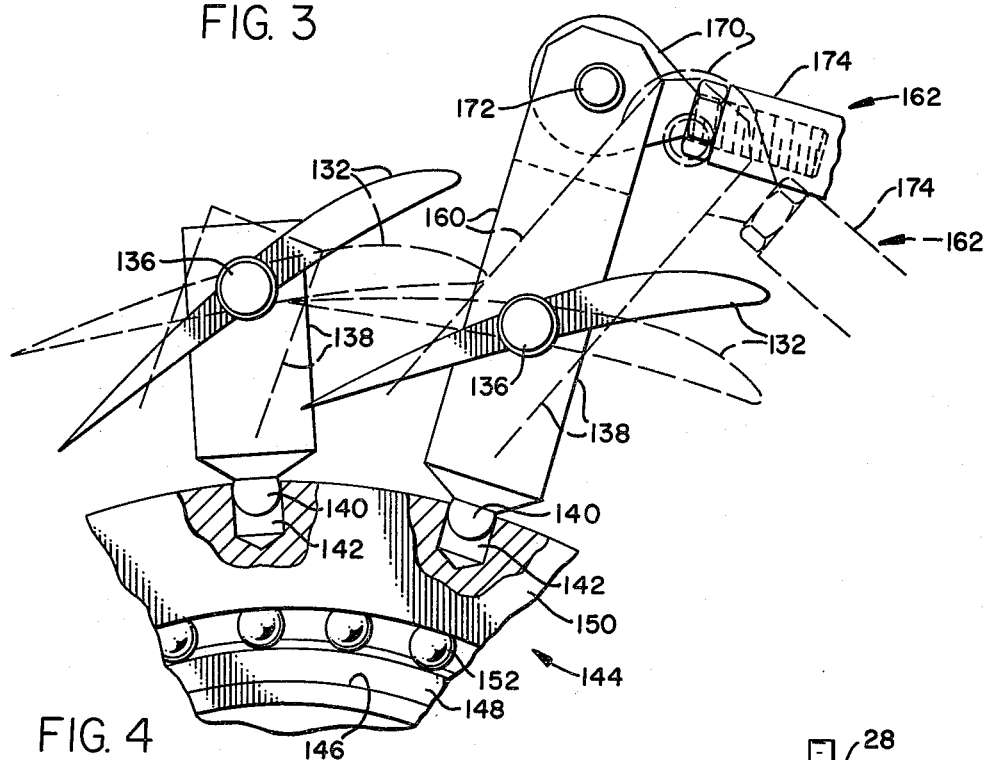
FIG. 4 is an enlarged section view taken along lines 4—4 of FIG. 2 and looking in the direction of the arrows with the compressor backwall removed for clarity.

FIG. 4 shows in phantom and solid lines nozzle vanes 132 in a closed and open position. It will be appreciated that each of the nozzle vanes is set by the rotation of control ring 144 through the movement of a single control rod 162 controlled by a single actuator 164.

Therefore, the present invention provides a turbocharger with the turbine nozzle area controlled by the movement of a single control ring rotating a plurality of actuator arms circumferentially spaced about the control ring. Moreover, the control ring and actuation levers are positioned in the unused air gap space existing between the turbocharger turbine and compressor thereby making a very compact unit. Moreover, the particular location of the linkage further insulates the bearing assemblies from the heat to which the turbine and the surrounding area is subjected. In this way, the bearing assemblies may be oil starved or limitedly lubricated. This in turn eliminates the need for conventional lubrication by use of engine oil and the associated plumbing requirements required by such a lubrication method. This of course makes the turbocharger of the present invention less expensive to construct and operate and more reliable.

Moreover, the use in the present invention of ball bearing supports, and the corresponding elimination of thrust and disc type bearings, provide for a more controlled or "stiffer" turbine and compressor shaft thereby allowing smaller clearances between both the turbine and the compressor and their surrounding structures. For example, in the present invention the compressor blade height for a turbocharger for use with relatively small internal combustion engines could be on the order of 0.2 inches. The use of the ball bearing assemblies described above permits the design of the compressor with only a 0.005 inch clearance amounting to only 2.5 percent of the overall height of the blade. By contrast, were a journal and disc type bearing to be employed, a substantially greater clearance would be required. As a result, the present invention is particularly adaptable to the construction of a turbocharger for smaller internal combustion engines where the smaller blade heights require closer clearances between the blades and the surrounding structure.

The use of ball bearings and their resultant lower frictional losses when compared to the journal and disc type bearings also make possible for the first time the efficient use of a turbocharger which produces less turbine horsepower without losing a substantial portion of the turbine horsepower to bearing losses and friction. Where a journal and disc type bearing could account for a 4-5 horsepower loss in friction the loss in friction by the present arrangement would be on the order of 0.1-0.4 horsepower.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. The present invention is therefore intended to encompass such rearrangements, modifications and substitutions of parts and elements as fall within the scope of the appended claims.

What is claimed is:

1. In combination with an internal combustion engine, a turbocharger comprising:
   a shaft,
   a turbine attached to one end of said shaft for receiving driving exhaust gases from said engine,
   a compressor fitted on said shaft for rotation with said turbine, said compressor supplying air to the engine,
   bearing means for rotatively supporting said shaft such that said compressor and turbine are overhung to one side of said bearing means such that said bearing means is removed from said turbine,
   a plurality of nozzle vanes spaced about said turbine and in the inlet through which exhaust air from the engine is received to said turbine, and
   control means intermediate of said compressor and turbine for rotating said nozzle vanes to vary the flow of exhaust air to said turbine.

2. The turbocharger according to claim 1 further comprising:
   means for providing only limited lubrication to said bearing assemblies.

3. The turbocharger according to claim 1 further comprising:
   lubrication means for supplying a lubricant mist to said bearing means to provide lubrication thereto.

4. The turbo charger according to claim 3 wherein said lubrication means comprises:
   an inclined circumferential ramp formed on said shaft and angled toward said bearing means, and
   lubricant means for supplying a lubricant to said inclined ramp such that said lubricant is carried by centrifugal force to said bearing means during rotation of said shaft.

5. The turbocharger according to claim 1 wherein said control means comprises:
   a control ring moveable angularly relative to said turbine,
   an actuation lever rotatable with each said vane and having one end engaged in the control ring,
   a control rod attached to one of said actuation levers, and
   means for selectively moving said control rod to angularly rotate said control ring thereby rotating said actuation levers and the vanes attached thereto.

6. The turbocharger according to claim 5 wherein said control ring comprises:
   an outer ring having apertures therein for receiving said one end of each said actuation levers,
   an inner ring fixed relative to said housing, and
   a plurality of balls assembled between said outer and inner rings to permit angular rotation of said outer ring relative to said inner ring.

7. The turbocharger according to claim 1 wherein said bearing means comprises:
   first and second inner raceways formed in said shaft,
   a first outer raceway ring fixed to said housing and positioned to correspond to said first inner raceway for receiving a plurality of balls therebetween,
   a second outer raceway ring slidable relative to said first outer raceway ring and positioned adjacent said second inner raceway for receiving a plurality of balls therebetween, and
   spring means for biasing said second outer raceway ring away from said first outer raceway ring to position the balls between said first outer raceway ring and inner raceway and said second outer raceway ring and second inner raceway thereby positioning said shaft relative to said housing.

8. A turbocharger comprising:
   a housing having a compressor air inlet and compressor air exhaust, a turbine air inlet, and a turbine air exhaust,
   a radial flow compressor fitted within said compressor housing for receiving air from the compressor air inlet and discharging compressed air through the compressor air exhaust,
   a turbine wheel attached to said compressor wheel for rotation therewith and positioned in said turbine housing to receive air from the turbine air inlet for driving the turbine and discharging the air through the turbine air exhaust,
   a shaft supporting said compressor and said turbine and extending from said compressor and away from said turbine,
   bearing support means attached to said compressor housing for rotatively supporting said shaft such that said compressor and said turbine are positioned to one side of said bearing support means with said bearing support means separated from said turbine by said compressor,
   a plurality of nozzle vanes circumferentially spaced about said turbine and in the inlet through which exhaust air from the engine is received to said turbine, and
   control means intermediate of said compressor and turbine for rotating said nozzle vanes to vary the flow of exhaust air to said turbine.

9. The turbocharger according to claim 8 further comprising:
   means for providing only minimal lubrication to said bearing assemblies.

10. The turbocharger according to claim 8 further comprising:

lubrication means for supplying a lubricant mist to said bearing support means to provide lubrication thereto.

11. The turbo charger according to claim 10 wherein said lubrication means comprises:
an inclined circumferential ramp formed on said shaft and angled toward said bearing means, and
lubricant means for supplying a lubricant to said inclined ramp such that said lubricant is carried by centrifugal force to said bearing means during rotation of said shaft.

12. The turbocharger according to claim 8 wherein said control means comprises:
a control ring moveable angularly relative to said nozzle vanes,
an actuation lever rotatable with each said vane and having one end engaged in said control ring,
a control rod attached to one of said actuation levers, and
means for selectively moving said control rod to pivot said actuation lever thereby rotating said control ring and said other actuation levers to control the angular position of said vanes.

13. The turbocharger according to claim 12 wherein said control ring comprises:
an outer ring having apertures therein for receiving said one end of each said actuation lever,
an inner ring fixed relative to said housing, and
a plurality of balls assembled between said outer and inner rings to permit angular rotation of said outer ring relative to said inner ring.

14. The turbocharger according to claim 8 wherein said bearing means comprises:
first and second inner raceways formed in said shaft,
a first outer raceway ring fixed to said housing and positioned to correspond to said first inner raceway for receiving a plurality of balls therebetween,
a second outer raceway ring slidable relative to said first outer raceway ring and positioned adjacent said second inner raceway for receiving a plurality of balls therebetween, and
spring means for biasing said second outer raceway ring away from said first outer raceway ring to position the balls between said first outer raceway ring and inner raceway and between said second outer raceway ring and second inner raceway thereby positioning said shaft relative to said housing.

15. In a turbocharger having a compressor for supplying air to an engine, a turbine driven by exhaust air received from the engine, a variable area turbine nozzle system comprising:
a plurality of nozzle vanes spaced about said turbine and in the inlet through which exhaust air from the engine is received to said turbine,
control means intermediate of said compressor and turbine for rotating said nozzle vanes to vary the flow of exhaust air to the turbine.

16. The variable area turbine nozzle system of claim 15 wherein said control means comprises:
a control ring moveable angularly relative to said nozzles,
an actuation lever attached to and rotatable with each said vane and having one end engaged in said control ring,
a control rod attached to one of said actuation levers,
means for selectively moving said control rod to pivot said actuation lever thereby rotating said control ring and said actuation levers to control said vanes attached thereto.

17. The variable area turbine nozzle system of claim 16 wherein said control ring comprises:
an outer ring having apertures therein for receiving said one end of each said actuation lever,
an inner ring fixed relative to said nozzles, and
a plurality of balls assembled between said outer and inner rings to permit angular rotation of said outer ring relative to said inner ring.

18. The variable area turbine nozzle system of claim 15 wherein said control means comprises:
a control ring moveable angularly relative to said nozzle and mounted intermediate of said compressor and turbine,
a shaft attached to each said nozzle vane and supporting each said nozzle vane for rotation about said shaft,
an actuation lever attached to and rotatable with each said shaft and having one end engaged in said control ring,
a control rod attached to one of said actuation levers, and
means for selectively moving said control rod to pivot said actuation lever thereby rotating said control ring and said actuation levers to control the angular position of said vanes.

19. The variable are turbine nozzle system of claim 18 wherein said control ring comprises:
an outer ring having apertures therein for receiving said one end of each said actuation lever,
an inner ring fixed relative to said nozzles and intermediate of said compressor and turbine rotors, and
a plurality of balls assembled between said outer and inner rings to permit angular rotation of said outer ring relative to said inner ring.

20. A bearing support structure for supporting the rotation of a compressor and turbine of a turbocharger, comprising:
a shaft extending from said compressor and turbine and having a first and second inner raceway formed therearound,
an outer housing having a fixed raceway corresponding to said first inner raceway for receiving a plurality of balls between the raceway of said outer housing and said first inner raceway,
a second outer raceway ring slidable relative to the raceway of said outer housing and positioned adjacent said second inner raceway for receiving a plurality of balls therebetween,
spring means for biasing said second outer raceway ring away from the raceway of said outer housing to position the balls between the raceway of said outer housing and first inner raceway and said second outer raceway ring and second inner raceway thereby positioning said shaft relative to said outer housing,
an inclined circumferential ramp formed on said shaft and angled toward the balls positioned between the raceway of said outer housing and said first inner raceway, and
lubricant means for supplying lubricant to said inclined ramp through a wick having one end in contact with said lubricant and the opposite end in contact with the inclined ramp such that said lubricant is applied to the ramp and carried by centrifugal force to the balls during rotation of said shaft.

21. The bearing support structure of claim 20 further comprising:
   lubrication means for supplying a lubricant mist to the balls between the raceway of said outer housing and said first inner raceway to provide lubrication thereto.

22. The bearing support structure of claim 20 further comprising:
   a second inclined circumferential ramp formed on said shaft and angled toward the balls positioned between said second outer raceway ring and said second inner raceway, and
   lubricant means for supplying a lubricant to said second inclined ramp through a wick having one end in contact with said lubricant and the opposite end in contact with the inclined ramp such that said lubricant is applied to the ramp and carried by centrifugal force to the balls during rotation of said shaft.

* * * * *

UNITED STATES PATENT AND TRADEMARK OFFICE
CERTIFICATE OF CORRECTION

PATENT NO. : 4,179,247

DATED : December 18, 1979

INVENTOR(S) : Norbert L. Osborn

It is certified that error appears in the above-identified patent and that said Letters Patent are hereby corrected as shown below:

Column 1, line 22, change "50-10 percent" to
-- 5-10 percent --.
Column 2, line 52, change "system" to -- systems --.
Column 2, line 64, change "turbochangers" to
-- turbochargers --.
Column 12, line 28, change "are" to -- area --.

Signed and Sealed this

Fifteenth Day of April 1980

[SEAL]

Attest:

SIDNEY A. DIAMOND

Attesting Officer

Commissioner of Patents and Trademarks